US011798428B2

(12) United States Patent
Herschberg (10) Patent No.: US 11,798,428 B2
(45) Date of Patent: Oct. 24, 2023

(54) SYSTEM FOR ASYNCHRONOUSLY PROVIDING CONTENT FROM ONE OR MORE AUTHORS FOR SPACED REPETITION

(71) Applicant: Cognosco Media LLC, New York, NY (US)

(72) Inventor: Mark A Herschberg, New York, NY (US)

(73) Assignee: Cognosco Media LLC, New York, NY (US)

( * ) Notice: Subject to any disclaimer, the term of this patent is extended or adjusted under 35 U.S.C. 154(b) by 151 days.

(21) Appl. No.: 17/226,031

(22) Filed: Apr. 8, 2021

(65) Prior Publication Data

US 2021/0319713 A1     Oct. 14, 2021

Related U.S. Application Data

(60) Provisional application No. 63/007,365, filed on Apr. 9, 2020.

(51) Int. Cl.
*H04L 67/55* (2022.01)
*G09B 7/02* (2006.01)
*G09B 19/00* (2006.01)

(52) U.S. Cl.
CPC ............... *G09B 7/02* (2013.01); *G09B 19/00* (2013.01); *H04L 67/55* (2022.05)

(58) Field of Classification Search
CPC ............ H04L 67/55; G09B 19/00; G09B 7/02

USPC ........................................................ 709/217
See application file for complete search history.

(56) References Cited

U.S. PATENT DOCUMENTS

| | | | |
|---|---|---|---|
| 5,797,601 A | 8/1998 | Ritchie | |
| 8,108,786 B2 | 1/2012 | Tucci | |
| 2012/0251994 A1 | 10/2012 | Gray | |
| 2012/0322043 A1 | 12/2012 | Edge et al. | |
| 2016/0018968 A1 | 1/2016 | Wilson et al. | |
| 2016/0225272 A1 | 8/2016 | Shea | |
| 2016/0321311 A1* | 11/2016 | Tallamraju | G06F 16/1774 |
| 2021/0382915 A1* | 12/2021 | Qian | G05B 19/4183 |

\* cited by examiner

*Primary Examiner* — Sibte H Bukhari
(74) *Attorney, Agent, or Firm* — Hamilton, Brook, Smith & Reynolds, P.C.

(57) ABSTRACT

An asynchronous content delivery system is provided that pushes messages or notifications of content designed for spaced repetition. Machine learning may be used to create, select and prioritize the messages/notifications. The asynchronous content delivery system may support asynchronous promotion of the content to the user. The asynchronously delivered content may be at least partially derived from a conversation agent operating on a user device. In another example, the content may be created or selected independently by a plurality of content providers and artificial intelligence algorithms. The content may be classified in sets according to a set of rules of combination. The content may be asynchronously delivered to end user devices according to a set of rules of delivery. The rules of delivery may influence a manner in which the content, or a representation thereof, is manifest on the end user devices.

25 Claims, 5 Drawing Sheets

SYSTEM FOR ASYNCHRONOUSLY PROVIDING CONTENT FROM ONE OR MORE AUTHORS FOR SPACED REPETITION

RELATED APPLICATION(S)

This application claims the benefit of U.S. Provisional Application No. 63/007,365, filed on Apr. 9, 2020. The entire teachings of the above application are incorporated herein by reference.

BACKGROUND

Users may have access to an ever-increasing variety of information from a vast array of sources, such as via books, ebooks, media, podcasts, webcasts, news articles, website, emails, and the like. The difficulty to remember relevant information and the source of that information increases as more and more diverse sources and content are available. With so many sources, successful retention of salient portions of that information can be challenging. If a user cannot recall desirable information from an electronic source or the specific section of the source from which it came from, a user may lose the ability to find that information.

Consequently, it is increasingly difficult for a user to locate desired information from a vast array of information sources, which may lead to user frustration with the traditional techniques used to access the information.

SUMMARY

Over the years, techniques, tests, and games have been created to improve memory. Spaced repetition is one of these solutions. Spaced repetition is used in many different areas of memory improvement. This is traditionally done with physical flashcards involving a question on one side and an answer on another. Today, it can be done electronically. For example, flashcard applications (apps) exist on specific predefined topics. Such flashcard apps allow users to learn about those topics. Typically, the implementation involves an exchange of questions and answers through custom-built applications.

Existing systems typically allow a content set to be created by users that intentionally coordinates the build of the content set. Such existing systems are designed to let the user access the content when they actively engage in a tool, such as opening an app on a mobile phone.

Services exist that provide a user with daily notifications, for example, daily affirmations, Bible quotes, and daily horoscopes. These systems are also purpose built and have set content.

Conventional electronic flash card implementations generally involve customization by a user or a developer, for example, to create a flashcard software implementation. For most, the use of flashcards is a proactive choice, meaning many are rarely used, or the associated app is quickly discarded by the user.

While electronic flash card systems and other memory retention techniques are available, as described above issues remain. It is desirable to provide a technical solution that addresses the issues described above.

The present disclosure provides innovations that address such issues. In an example embodiment, an asynchronous content delivery system is provided. The system pushes messages or notifications of content designed for spaced repetition. The asynchronous content delivery system can enable content to be easily shared onto custom apps with a single share of voice, or onto a single app taking in multiple sets of content generated by independent authors. The asynchronous content delivery system can support asynchronous promotion of the content to the user.

In an example embodiment, a system for asynchronous content delivery includes at least one processor configured to obtain content including a plurality of digital memory card (e.g. virtual flash cards) from one or more content providers. The processor is further configured to classify one or more sets of the obtained digital memory cards by following rules of combination pertaining to the obtained digital memory cards. The processor is further configured to transmit a set of digital memory cards to an end user device and to configure the end user device to receive the transmitted set. The processor is further configured to configure the end user device to asynchronously manifest representations of digital memory cards of the transmitted set by following rules of delivery, prompting a user to further interact with the device to view a digital memory card corresponding to a presently manifest representation thereof. Such content sharing and distribution may or may not involve payment. In some embodiments, the configuration may be done on the end user device. (i.e. settings for things like the time of day the alert is sent may be configured on the phone, as opposed to on the server).

The obtained content may represent content selected by the one or more content providers from existing source content. Alternatively, or in addition, the obtained content may represent content originally created by the one or more content providers. The end user device may be an Internet of Things (IoT) device. The end user device may be a computer, a smartphone, a tablet, a speaker device, a smart device, or an appliance.

The processor may be further configured to configure the end user device to manifest representations of digital memory cards of the transmitted set in response to a stimulus from at least one of a connected device and a user. A set of the one or more classified sets of digital memory cards may include digital memory cards that are chained together in a pre-set order. The order may be implemented by following at least one of a direction of a user and rules of chain sequencing.

In another embodiment, a processor-implemented method of asynchronously delivering content includes obtaining content including a plurality of digital memory cards from one or more content providers. The method further includes classifying one or more sets of the obtained digital memory cards by following rules of combination pertaining to the obtained digital memory cards. The method further includes transmitting a set of digital memory cards to an end user device, and configuring the end user device to receive the transmitted set. The method further includes configuring the end user device to issue alerts (asynchronously manifest representations) of digital memory cards of the transmitted set by following rules of delivery, thereby prompting a user to further interact with the device to view a digital memory card corresponding to a presently manifest representation thereof. In some embodiments, the asynchronously manifest alert may be delivered via audio transmission, recording, text delivery, or other electronic transmission. In this way, the asynchronously manifest alert may be transmitted in a visual or sound representation (e.g. view or hear).

Such content sharing and distribution may or may not involve payment. This embodiment may further optionally include any features described herein in connection with any of the other embodiments described herein.

In another embodiment, a non-transitory computer-readable data storage medium has computer-readable program codes embodied therein for asynchronously delivering content. The computer-readable data storage medium program codes include instructions that, when executed, cause the processor to obtain content including a plurality of digital memory cards from one or more content providers. The processor is further configured to classify one or more sets of the obtained digital memory cards by following rules of combination pertaining to the obtained digital memory cards. The processor is further configured to transmit a set of digital memory cards to an end user device and to configure the end user device to receive the transmitted set. The processor is further configured to configure the end user device to asynchronously manifest representations of digital memory cards of the transmitted set by following rules of delivery, prompting a user to further interact with the device to view a digital memory card corresponding to a presently manifest representation thereof. It should be noted that the processor may be located anywhere, for example, at a server or at the client device. Such content sharing and distribution may or may not involve payment. This embodiment may further optionally include any features described herein in connection with any of the other embodiments described herein.

In an embodiment, a content delivery computer system may be provided. The system may include a conversation agent configured to receive content identifications from a user device, the content identifications being derived from a plurality of digital sources including at least one of: text, audio, and images.

At least one computer processor, at the user device or at a server, may be configured to interface with the conversation agent. The computer processor may cause a plurality of digital memory cards to be created from the content identifications. The digital memory cards may be created by classifying the content identifications to create one or more sets of the digital memory cards by following rules of spaced repetition combinations pertaining to the digital memory cards.

The digital memory cards may be transmitted to the user device. The digital memory cards may be transmitted in response to biometrics received from wearable device(s) associated with the user. For example, changes in heart rate or changes in heart rate variability (HRV) or calories expended may cause the digital memory cards to be transmitted to the user device(s). The user device(s) may be configured to receive asynchronously representations of the digital memory cards. Machine learning may be used to determine further sets of digital memory cards predicted to be relevant to the user. These further sets may be predicted to have similar topics as those identified in the content identifications received by the conversation agent. The system may determine that the predicted similar topic content has a high degree of confidence as being relevant to the user. The content delivery computer system may transform the predicted similar topic content into digital memory cards and asynchronously deliver them to the user device(s).

The content delivery computer system may configure the end user device to receive the transmitted set of digital memory cards through a registration process. For example, the end user device may be registered with a service provider. An access control application at the end user device, may pair the end user device with the service provider to configure the user device to receive the set of digital memory cards.

The access control application at the end user device may further configure a multitude of additional computing devices associated with the end user device to receive the set of digital memory cards. For example, each of the additional computing devices may be registered with the service provider. The access control application may pair each of the additional computing devices with the service provider to configure each of which to receive at least a portion of the set of digital memory cards. In some examples, the service provider may cause the set of digital memory cards to be broadcast to the additional computing devices. In some examples, the end user device may cause the set of digital memory cards to be broadcast to the additional computing devices.

The content delivery computer system may configure the end user device to receive the transmitted set of digital memory cards via an alert in response to changes detected in biometrics processed from a wearable computing device associated with the user. For instance, the alert may be triggered in response to biometric changes causing a broadcast of the set of digital memory cards to the additional computing devices.

BRIEF DESCRIPTION OF THE DRAWINGS

The foregoing will be apparent from the following more particular description of example embodiments, as illustrated in the accompanying drawings in which like reference characters refer to the same parts throughout the different views. The drawings are not necessarily to scale, emphasis instead being placed upon illustrating embodiments.

DETAILED DESCRIPTION

A description of example embodiments follows. The teachings of all patents, published applications and references cited herein are incorporated by reference in their entirety.

Certain systems and methods described herein relate to delivering messages with asynchronous content.

System Architecture

Figure 1:
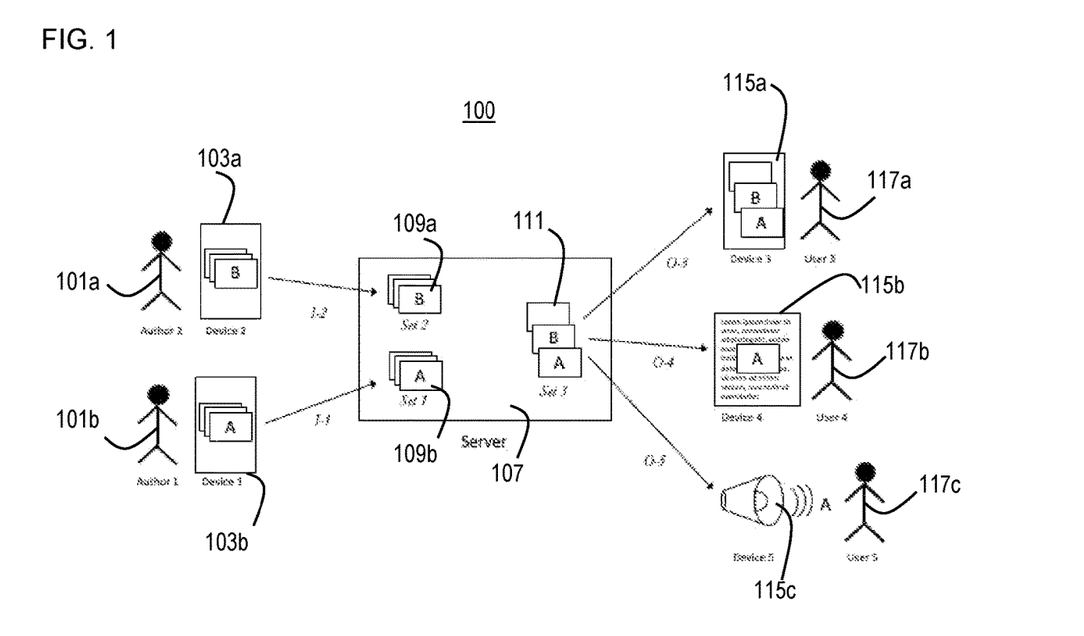
FIG. 1 illustrates a schematic block diagram of an example embodiment of a system for asynchronous content delivery.
Figure 3:
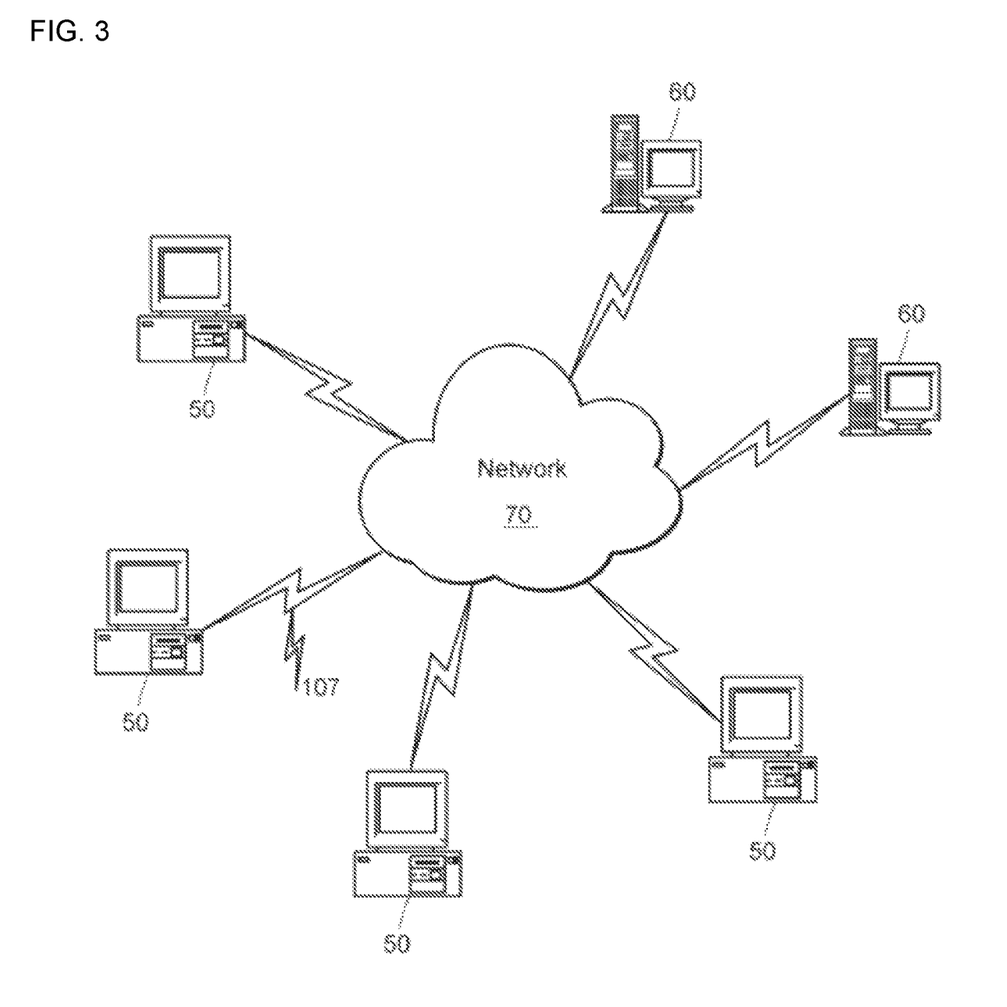
FIG. 3 is a schematic diagram of a computer network environment in which embodiments may be deployed.

FIG. 1 shows the working of an example embodiment of a system for asynchronous content delivery. Referring to FIGS. 1 and 3, according to an embodiment, Author 1 101*b* and Author 2 101*a* create sets of content on their devices 103*a*, 103*b*, 50. The content is transferred to the server 60 in I-1 and I-2 as Set 1 109*b* and Set 2 109*a*.

In one example embodiment, the server 60 creates a Set 3 111 following a set of rules. The set of rules used to create Set 3 111 may be referred to as rules of combination. In a further example embodiment, the client 50 creates a Set 3 111 following a set of rules. Sets 1 109*b*, 2 109*a*, and 3 111 consist of one or more memory cards. Memory cards may herein be referred to interchangeably as flash cards or digital memory cards.

Devices 50, 1 103*b*, 2 103*a*, 3 115*a*, 4 115*b*, and 5 115*c* may be any type of computing device. For example, such devices may be computers, mobile devices, cellular phones, tablets, smart speakers, or smart watches, other IoT devices.

Set 3 111 is transferred to Device 3 115*a* in O-3, to Device 4 115*b* in O-4, to Device 5 115*c* in O-5.

After Set 3 111 (or in an alternative embodiment Set 1 109*b* is transferred to Device 4 115*b*, one piece of the content, or otherwise a representation of the content is popped up on the device 115*b* to notify User 4 117*b* despite the application not being active on the device 115*b* display.

In the embodiment, Device 5 115*c* is a speaker, possibly without a screen. After Set 3 111 of the content is transferred in O-5 to the speaker 115*c*, the speaker 115*c* audibly provides the content, denoted in FIG. 1 as "A", the audible representation of the content either on command or asynchronously.

In some embodiments, there is a memory card, which is a short piece of content including, but not limited to text, images, audio, video, rich media content, VR, holograms, or other media content. The term "digital memory card" herein refers to a message or an electronic aid to facilitate user memorization, such as a digital representation of a flash card on an electronic device, or a virtual card. Such digital memory cards may contain additional information such as, but not limited to, classification, source, authors, dates, or other types of tagging. A memory set involves one or more cards. Sets may contain other sets in part or whole. The memory cards or memory set may be stored individually or in a single file, such as a text file or database or other appropriate format. The systems and methods of the present disclosure provide a general platform for content management allowing one or more authors to create and distribute one or more sets of digital memory cards in the following ways described below. These sets of memory cards may then be delivered asynchronously to the user, possibly but not necessarily, one memory card at a time.

In some embodiments, the sets of digital memory cards may be assigned to a specific, branded app 92 on a mobile phone or other computing device 50. In such an embodiment, the app is limited to specific sets of memory cards. Such an app and its content sets may be free or paid.

In some embodiments, there is an app for a user device or other computing device. Using the app, a user can access one or more sets of memory cards at a time and view one or more memory cards. The app and/or its content sets may be free or paid, with some sets being free and others paid. The access of the cards may be visual, such as on a screen, projected using a light source, or vocalized through a device, such as a smart device or a speaker (on a device which may or may not also have a screen).

In some embodiments, the user may create the content. In some embodiments, the user may source the content, potentially directly from other media by copying, referencing, or another method. In some embodiments, the content may be learned from the user using machine learning. The content may be created or sourced on a computer or a mobile device including, but not limited to, phones, IoT devices, or tablets. The content may be created or sourced from an input, including, but not limited to, cameras, microphones, or other peripherals or other input devices. In some embodiments, the content may be learned from the user using machine learning or artificial intelligence, or similar techniques.

The content may be kept exclusive to the user or shared with others, similar to a favorites list which may be kept private, shared only with a limited set of people such as a friends list, or shared publicly. For example, a user may create their own custom set of digital memory cards, e.g. my favorite tips. This custom set may be set to private, public or shared to a subset, such as a select group of users or intranet. Rules, or sets of rules, may be applied for combining pieces of content from one or more content providers. For example, multiple content providers may view a source document, and each content provider may select audio and/or visual content.

For example, a number of sentences, may be transformed into a digital notification or alert, including digital memory cards, audio representations, text alerts. In some embodiments, the transformed content is transmitted by a notification system 60 having a combination of software and hardware that provides a means of delivering a message to a set of recipients. In some user devices 50, it may be implemented as dedicated hardware such as a notification LED to deliver messages or notify users.

In an example embodiment, a server or a processor, by following a set of rules, generates a set of memory cards from this source document, which set of memory cards only includes sentences that have been selected from the source document by at least two content providers. In some embodiments, much more advanced and complex sets of rules can be applied. In some embodiments, rules include weights to be assigned to various pieces of content to influence selections thereof. The rules may or may not use some or all of the other data, such as tags, when making decisions.

The content may be asynchronously delivered to the user. For efficiency, the content may or may not already be installed, downloaded, or otherwise exist on an end user's device. When already present on the end user's device, the content or a portion or representation thereof can be popped up on a screen, even when the app 92 has not been made active by the user (e.g. running in the background). Such notifications, also known as popups or alerts, may appear using standard alert mechanisms on the device (including, but not limited to, notifications on a mobile phone), or using a new alert mechanism in the app. Such notifications alternatively may take context on the device, for example, but not limited to, having the content appear on the screen. The timing of the content delivery may be set by the user, or by a rule or set of rules, or be random. In an alternative embodiment, the content may be delivered through other channels, including, but not limited to, email, text, virtual reality (VR), video, image, and audio channels. Different memory cards may be delivered through different channels and or use different channels at different times.

In some embodiments, the delivery may be asynchronous or in immediate response to the user request. The delivery may be random, ordered, or delivered as per a predefined set of rules, potentially based on input from other users. The system may have rules based on a user's response to the alert, including how quickly the user responds and/or how the user responds. For example, the user may designate some content to be repeated one or more times, or at a different frequency than other content, or otherwise designate some of the memory cards in the set to behave differently than other memory cards.

In some embodiments, a plurality of digital memory cards may be chained together in a pre-set order. For example, in a set of 20 cards, cards 1 through 5 may be delivered in a random order, but cards 16, 17, 18, 19, and 20 may be delivered in numerical order, such that card 17 always follows 16, card 16 always precedes card 17, or both, unless the user actively disengages delivery of the chain. In an alternative embodiment, more advanced chains may be supported based on users' responses, such as, but not limited to deciding whether to continue to chain or to drill down into a more specific topic, based on the user's action. In an alternative embodiment, chain sequencing rules may be applied based on user response to a question or questions.

User response or interaction may be through typing, gestures, audio command, touch, a touch device, or video input of the user or other entity performing an action. The response may be to the alert or to a specific memory card.

In an alternative embodiment, points or other reward systems may be employed for users based on, but not limited to, duration, repetition, or other metrics.

Access to the content, either as a single app or shared app, may require a login or other validation or authorization.

In some embodiments, the content of the digital memory card, which is possibly but not always asynchronously delivered to the user, may be interactive, asking the user to respond to one or more prompts and provide input. Alternatively, the content of the digital memory card may be delivered according to rules set by the content creator, such as having specific content to be delivered at certain times (e.g. a calendar date, or at the start of every quarter), or based on actions on the back end of the platform, or tied to triggers from third party events. For example, if employees of a company fail a company phishing test, the failure may automatically trigger the company to send the failing employees an alert based on a memory card related to phishing the next day.

In an alternative embodiment, the content may be accessed directly, intentionally by the user at the users request through an audio channel on a smart speaker, phone or IoT. Alternatively, other channels may be used like text (SMS), telephone call, voice message, screen display, or other I/O device or method.

In an alternative embodiment, a user action outside of the application may automatically trigger delivery of content. For example, content may be delivered after a user measures his heart rate, or after the user has been engaged with the device for at least 20 minutes. In this way, the software 92 may interface with the application programming interface of a wearable computing device, and notifications may be triggered based on the biometrics from the wearable computing device 50.

Optionally, the platform 92 may provide one or more quizzes or tests. Unique to this system is that the quiz or test questions may be delivered asynchronously, possibly in response to a user action. For example, questions may be delivered after a user measures his heart rate, or after the user has been engaged with the device for at least 20 minutes.

In some embodiments, unlike other spaced repetition apps, systems and methods of the present disclosure allow for 100% share of voice of a mobile application, or equivalent on other IoT devices, with no branding from the platform or third parties.

In one example embodiment, an author of a book, or an instructor for a class, may be enabled to create a number of lessons, where the lessons may include key points, quotes, formulas, key facts, or other information. A user reading the book or taking the class may be enabled to receive a daily alert on a mobile phone or another electronic device reminding them of one or more of the points each day.

In another example embodiment, a user, such as a student, may take notes from reading a text. This student may be enabled to share her notes with a group of selected friends.

In another example embodiment, readers of a book may be enabled to select and upload favorite points and quotes. The system may further select content that a minimum number of users have indicated. Users of the system may be enabled to see the most selected (or voted up) content by all users. An alert sent to users regarding such content may be, for example, a popup on a mobile phone, or a daily reminder on an audio tool. A user may also be enabled to flip through content as a virtual deck of cards. In another example embodiment, the system may assign a weight to a piece of content, for example, based on an identity of a user who had selected the piece of content, say in a friend's list supplied by the user.

Figure 2:
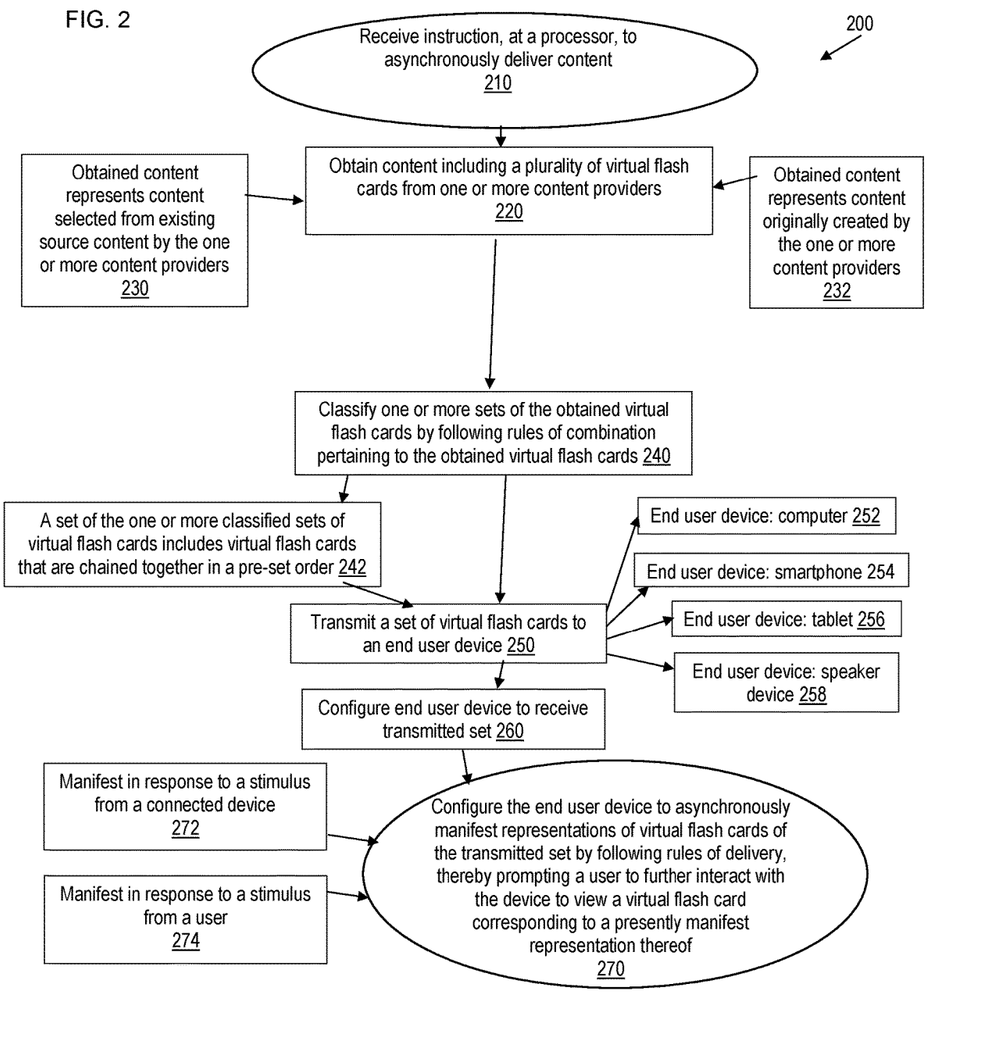
FIG. 2 illustrates a flow diagram showing an example embodiment of a method for asynchronous content delivery.

FIG. 2 illustrates an example embodiment of a process 200 of asynchronously delivering content. According to the embodiment, the method 200 includes, at a processor, receiving an instruction 210 to asynchronously deliver content. The method further includes obtaining content 220 including a plurality of digital memory cards from one or more content providers. The obtained content 220 may represent content selected from existing source content 230 by the one or more content providers. The obtained content 220 may represent content originally created 232 by the one or more content providers. The process 200 further includes classifying one or more sets 240 of the obtained digital memory cards by following rules of combination pertaining to the obtained digital memory cards.

It should be noted that in the event there is a null case, in some embodiments, no rules of combination may be provided. In some embodiments, a random number generator may be used to create the combination. For example, the system may use cipher algorithms and cryptographic hashes to implement a pseudorandom number generator.

A set of the one or more classified sets 240 of digital memory cards may include digital memory cards that are chained together in a pre-set order 242.

Continuing with reference to FIGS. 2 and 3, in the embodiment, the method 200 further includes transmitting 250 a set of digital memory cards 240 to an end user device. The end user device may be at least one of a computer 252, smart device, a smartphone or mobile device 254, a tablet computer 256, or a IoT 258 (e.g. smart device, speaker device). The method further includes configuring the end user device to receive 260 the transmitted set of digital memory cards 240. The method further includes configuring the end user device to asynchronously manifest representations 270 of digital memory cards of the transmitted set by following rules of delivery, thereby prompting a user to further interact with the device to view a digital memory card corresponding to a presently manifest representation thereof. The representations 270 of digital memory cards may be manifest in response to a stimulus from a connected device 272. The representations 270 of digital memory cards may be manifest in response to a stimulus from a user 274. The representations 270 may be implemented on the user device 50 or on the server 60.

Example implementations of the disclosed methods and systems may be implemented in a software, firmware, or hardware environment. FIG. 3 illustrates one such environment. For example, the method/system described above (including in FIGS. 1-2) may be implemented in the environment of FIG. 3. Client computer(s)/devices 50 (e.g., mobile phones or computing devices) and a cloud 60 (or server computer or cluster thereof) provide processing, storage, and input/output devices executing application programs and the like.

Client computer(s)/devices 50 can also be linked through communications network 70 to other computing devices, including other client devices/processes 50 and server computer(s) 60. Client computing devices 50 may include any computational device, including smart devices and IoT devices. Communications network 70 can be part of a remote access network, a global network (e.g., the Internet), a worldwide collection of computers, local area or wide area networks, and gateways that currently use respective protocols (TCP/IP, Bluetooth, etc.) to communicate with one another. Other electronic devices/computer network architectures are suitable.

Figure 4:
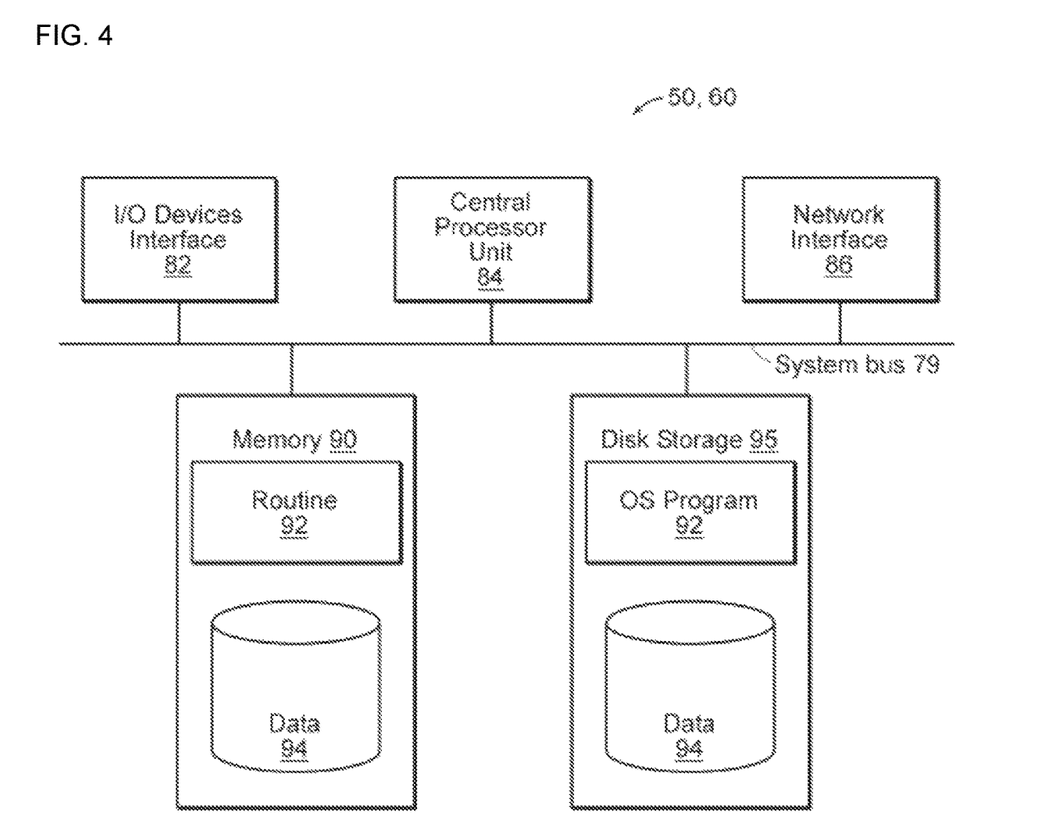
FIG. 4 is a block diagram of the computer nodes in the network of FIG. 3.

Embodiments of the disclosed methods and systems may include means for identifying, parsing monitoring, tracking, modeling, filtering, tuning, scaling, decoding, processing or scanning for routing data, such as content including a plurality of digital memory cards. FIG. 4 is a diagram of the internal structure of a computer/computing node (e.g., client processor/device/mobile phone device/IoT device 50 or server computers 60) in the processing environment of FIG. 3. For example, method/system described above (including in FIGS. 1-2) may be implemented by the computer/computing node of FIG. 4.

Each computer 50, 60 contains a system bus 79, where a bus is a set of actual or virtual hardware lines used for data transfer among the components of a computer or processing system. Bus 79 is essentially a shared conduit that connects different elements of a computer system (e.g., processor, packet analyzer, network interface disk storage, memory, input/output ports, etc.) that enables the transfer of data between the elements. Attached to the system bus 79 is an I/O device interface 82 for connecting various input and output devices (e.g., keyboard, mouse, displays, printers, speakers, etc.) to the computer 50, 60. Network interface 86 allows the computer to connect to various other devices attached to a network (for example, the network illustrated at 70 of FIG. 3). Memory 90 provides volatile storage for computer software instructions 92 and data 94 used to implement a software implementation of the disclosed methods and systems.

Disk storage 95 provides non-volatile storage for computer software instructions 92 (equivalently "OS program") and data 94 used to implement an embodiment of the disclosed methods and systems. Central processor unit 84 is also attached to system bus 79 and provides for the execution of computer instructions. Note that throughout the present text, "computer software instructions" and "OS program" are equivalent.

In one example, a system may be configured with computer readable instructions 92 that implement a method and/or system designed to asynchronously deliver content including a plurality of digital memory cards.

In an example mobile implementation, a mobile agent implementation of the asynchronous content delivery invention may be provided. A client server environment can be used to enable content delivery services using the server 60. It can use, for example, the XMPP protocol to tether a content identification engine/agent 92 and asynchronous content delivery engine/agent 92 on the device 50 to a server 60. The content identification engine/agent 92 may include semantic clustering and other functionalities that are described in the following sections. The server 60 can then issue commands to the mobile phone on request. The mobile user interface framework to access certain components of the system may be based on React Native to create an Android and iOS implementations. In other examples, the mobile interface framework may be based on XHP, Javelin and WURFL. In other example mobile implementation for OS X and iOS operating systems and their respective APIs, Cocoa and Cocoa Touch may be used to implement the client side components 92 using Objective-C or any other high-level programming language that adds Smalltalk-style messaging to the C programming language.

The system may also include instances of server processes on the server computers 60 that may comprise an asynchronous content delivery engine, which uses machine learning to selectively push notifications to the user, and execute algorithms, such as statistical algorithms to compute confidence scores, to make decisions regarding the notifications that are pushed to the user.

The computer program product 92 can be installed by any suitable software installation procedure, as is well known in the art. In another embodiment, at least a portion of the software instructions may also be downloaded over a cable, communication, and/or wireless connection. In other embodiments, the software is a computer program propagated signal product embodied on a nontransitory computer readable medium, which when executed can be implemented as a propagated signal on a propagation medium (e.g., a radio wave, an infrared wave, a laser wave, a sound wave, or an electrical wave propagated over a global network such as the Internet, or other network(s)). Such carrier media or signals provide at least a portion of the software instructions for the present invention routines/program 92.

In alternate embodiments, the propagated signal is an analog carrier wave or digital signal carried on the propagated medium. For example, the propagated signal may be a digitized signal propagated over a global network (e.g., the Internet), a telecommunications network, or other network. In one embodiment, the propagated signal is transmitted over the propagation medium over a period of time, such as the instructions for a software application sent in packets over a network over a period of milliseconds, seconds, minutes, or longer. In another embodiment, the computer readable medium of computer program product 92 is a propagation medium that the computer system 50 may receive and read, such as by receiving the propagation medium and identifying a propagated signal embodied in the propagation medium, as described above for the computer program propagated signal product.

A memory set involves one or more cards. Sets may contain other sets in part or whole. The digital memory cards or memory set may be stored individually or in a single file, such as a text file or database or other appropriate format. The systems and methods of the present disclosure provide a general platform for content management allowing one or more authors to create and distribute one or more sets of memory cards in the following ways described below. These sets of digital memory cards may then be delivered asynchronously to the user, possibly but not necessarily, one memory card at a time.

In some embodiments, the user may create the content, potentially directly from other media by copying, referencing, or another method. The content may be created or sourced from an input, including, but not limited to, cameras, microphones, or other peripherals or other input devices and processed by machine learning techniques to create models.

For example, topic models or statistical models may be created by computationally processing the sourced content and discovering the abstract "topics" that occur in a collection of documents. Topic modeling may be implemented using a text-mining tool for discovery of hidden semantic structures in the text body of the sourced content. Intuitively, given that the source document may be about a particular topic, one would expect particular words to appear in the document more or less frequently, yielding potential "topics". The "topics" produced by the topic identification process may include clusters of similar words. A topic model may be created from the potential topics to capture this intuition in a mathematical framework. This mathematical framework allows the content identification engine/agent 92, 204 to examine the sourced content, based on the statistics of the words appearing in the sourced content, providing confidence scores related to what the topics might be and what each sourced content's balance of topics likely is.

The topic models may be implemented as probabilistic topic models or statistical algorithms for discovering the latent semantic structures of the text body of the sourced content. The topic models can help the content identification engine/agent 92, 204 organize and offer insights to understand large collections of sourced content.

In another embodiment, the probabilistic topic models may be implemented using semantic clustering. Semantic clustering may be performed to provide a variety of functionality in processing the sourced content as described in more detail below.

Figure 5:
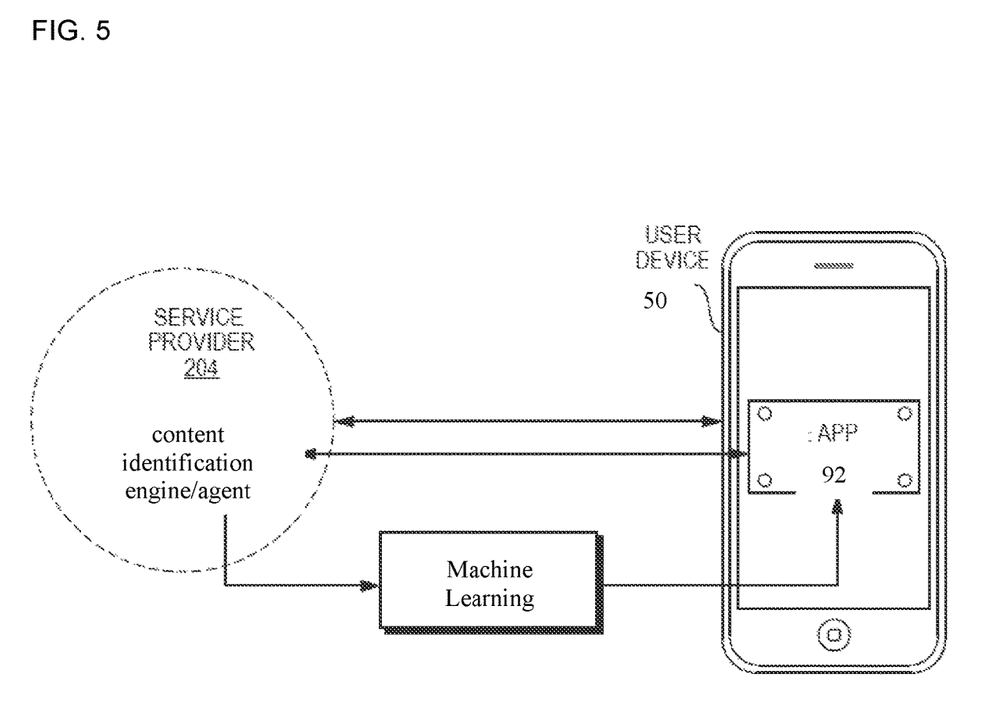
FIG. 5 is a diagram of components of an embodiment.

In an example implementation, such as that shown in FIG. 5, an asynchronous content delivery system 204 may be provided that helps to help service the content identification engine/agent 92 at the user devices 50 and deliver content to the user device. The system may include some software components 92, 204 (e.g. content identification engine/agent, asynchronous content delivery system, conversation agent, machine learning algorithms). For instance, content identification engine/agent 92, 204 can be configured to implement an instruction (text identification) from the user devices 50 and the machine learning components of the asynchronous content delivery system 92, 204 that can act on that instruction. A protocol according to an example embodiment defines how these instructions and replies are constructed. It should be noted that the software components 92, 204 can be implemented on the client device 50 and/or the server 60.

The content identification engine/agent 92, 204 preferably embodies the innovative binding between the physical and digital text works. The content identification engine/agent 92, 204 helps locks features of salient text identification to the user's profile and sends notifications and reminders regarding the salient text to the user device via the asynchronous content delivery system 92, 204 to create spaced repetition and help the user in memory improvement of that information.

The asynchronous content delivery system 92, 204 may use a secure socket to maintain a persistent connection with all of the user's devices 50 (e.g. smart devices, IoT devices, wearables, computing devices). This channel is used for pairing and other administrative functions. For example, content identification engine/agent 92, 204 may be active at the user's devices to extract content, the asynchronously content delivery system 92, 204 may be triggered to transmit alerts, and biometrics from the wearables 50 may cause the asynchronously content delivery system 92, 204 to transmit content/alerts. Library code may be provided to asynchronous content delivery system 92, 204 for simplifying the construction of the delivery of alerts and other content to the user.

Machine Learning

The system may learn from the user as it sources content directly from media by copying, referencing, or another method. The content may be derived, for example, from electronic text identified as relevant (or salient) by the user.

As discussed, semantic clustering may be performed to create topic models from the sourced content. For example, semantic clustering may be performed to group a corpus of user text identifications into zero or more semantic clusters where each cluster corresponds to salient text identifications that pertain to the same or to similar topics. This similarity of topics inside each cluster may be used by the content identification engine/agent 92, 204 for a variety of purposes, some of which may be described below. Furthermore, this similarity of topics may be used as an input to a machine learning algorithm, or to a neural network 107 to improve performance of the content identification engine/agent 92, 204, or to an asynchronously content delivery system 92, 204, which may identify or react to new or existing user recommendations by delivering related content to improve user memory of salient data from sourced text, among other applications.

In an embodiment, the content identification engine/agent 92, 204 may include an automatic learning system. The automatic learning system may collect salient data extracted from a digital source (e.g. an ebook or podcast) identified by a user. The data collected from the content identification engine/agent 92, 204 may be aggregated with other data identified by the user as salient. In one example, the data may be aggregated from all users to create a large corpus of salient data identified by users from the same digital source. For example, salient data from the same ebook identified by a plurality of users may be determined by the automatic learning system to be highly relevant, and the system may issue alerts or deliver content from this highly relevant content to the plurality of users and other user groups identified as having similar interests.

The content identification engine/agent 92, 204 may be implemented using one or more modules to either tract the user's engagement with a text, or for example, engage in an interactive natural language dialog to identify the salient data. In this way, the content identification engine/agent 92, 204 may enable the user to electronic identity salient points of the data from an information source, such as a book for example, that the user wishes to remember. This may help a publishing company to efficiently utilize resources and provide additional functionality to a user that was not previously available. The information may be input by the content identification engine/agent 92, 204 using a variety of mechanisms, such as responding to user interaction with text, e.g. highlighting portions of the text, or through transcripts of spoken words, or text inputs (e.g., instant messages, live chat, email, SMS, blogging and micro-blogging services, and so on), automatic speech recognition, and so forth.

Through use of linguistic analysis techniques, the content identification engine/agent 92, 204 may map user inputs identifying salient data from the sourced content into semantic models. Such representations may be models or graphs, the nodes of which represent concepts and the edges of which represent semantic roles.

The content identification engine/agent 92, 204 may represent a user salient data identification by an intent graph pattern or a plurality of intent graph patterns. Thus, salient data may be formed into a semantic graph and compared with intent graph patterns.

Semantic graphs representing salient data identified by one user or a plurality of users may be grouped into semantic clusters using various machine learning and semantic clustering techniques. These semantic clusters can then be leveraged to determine dominant or active topics in a corpus of salient data identification for a variety of purpose, including to improve the quality of the content identification engine/agent 92, 204. In order to decrease response times and system memory requirements, as the content identification engine/agent 92, 204 learns via machine learning about the types of topics and content that user likely is to be interested in, the content identification engine/agent 92, 204 can interface with the asynchronously content delivery system 92, 204 to deliver additional salient data notifications from media sources to the user.

In some embodiments, the content identification engine/agent 92, 204 is configured to accept natural language input from a user to identify salient data from a text source and then perform deep linguistic analysis of such identifications. Semantic clustering may be applied to the output of such analysis to provide a variety of functionalities, such as grouping a corpus of salient data text identifications into semantic clusters in which each cluster pertains to a similar topic. These semantic clusters may then be leveraged to identify topics and assess their relative importance in order to, for example, prioritize topics that occur frequently or topics whose handling by the content identification engine/agent 92, 204 should be improved. A variety of salient data text identifications may be processed using these techniques, such as spoken words or textual descriptions entered via instant messaging, voice-to-text, OCR, a website interface, SMS, email, a social networking, blogging or micro-blogging service, and so on.

While example embodiments have been particularly shown and described, it will be understood by those skilled in the art that various changes in form and details may be made therein without departing from the scope of the embodiments encompassed by the appended claims.

What is claimed is:

1. A system for asynchronous content delivery comprising:
    a processor configured to:
    obtain content including a plurality of digital memory cards from one or more third party content providers;
    classify one or more sets of the obtained digital memory cards by following rules of combination pertaining to the obtained digital memory cards, wherein a set of the one or more classified sets of digital memory cards includes digital memory cards that are chained together in a pre-set order configuration by following at least one of (i) a direction of a user and (ii) rules of chain sequencing;
    transmit the set of digital memory cards to an end user device;
    configure the end user device to receive the transmitted set;
    configure the end user device to asynchronously manifest representations of digital memory cards of the transmitted set by following rules of delivery, prompting a user to further interact via push notifications with the end user device to view a digital memory card corresponding to a presently manifest representation thereof; and
    configure the end user device to use machine learning to create a further set of digital memory cards predicted relevant to the user of the end user device based on one or more interactions of the user with the end user device.

2. The system of claim 1, wherein the obtained content represents content selected by the one or more third party content providers from existing source content.

3. The system of claim 1, wherein the obtained content represents content originally created by the one or more third party content providers.

4. The system of claim 1, wherein the end user device is at least one of (i) a computing device, (ii) a smart device, (iii) smart watch, or (iv) an Internet of Things (IoT) device; and the processor configures a secure socket to maintain a persistent connection with the end user device.

5. The system of claim 1, wherein the processor is further configured to configure the end user device to manifest representations of digital memory cards of the transmitted set in response to a stimulus from at least one of (i) a connected device and (ii) a user.

6. The system of claim 1, wherein the processor is at the end user device or at a server.

7. A processor-implemented method of asynchronously delivering content, the method comprising:
    obtaining content including a plurality of digital memory cards from one or more third party content providers;
    classifying one or more sets of the obtained digital memory cards by following rules of combination pertaining to the obtained digital memory cards, wherein a set of the one or more classified sets of digital memory cards includes digital memory cards that are chained together in a pre-set order configuration by following at least one of (i) a direction of a user and (ii) rules of chain sequencing;
    transmitting a set of digital memory cards to an end user device;
    configuring the end user device to receive the transmitted set;
    configuring the end user device to asynchronously manifest representations of digital memory cards of the transmitted set by following rules of delivery, thereby prompting a user to further interact via push notifications with the end user device to view a digital memory card corresponding to a presently manifest representation thereof; and
    configuring the end user device to use machine learning to create a further set of digital memory cards predicted relevant to the user of the end user device based on one or more interactions of the user with the end user device.

8. The method of claim 7, wherein the obtained content represents content selected by the one or more third party content providers from existing source content.

9. The method of claim 7, wherein the obtained content represents content originally created by the one or more third party content providers.

10. The method of claim 7, wherein the end user device is one of (i) a computing device, (ii) a smart device, (iii) smart watch, or (iv) an Internet of Things (IoT) device; and the processor configures a secure socket to maintain a persistent connection with the end user device.

11. The method of claim 7 further comprising configuring the end user device to manifest representations of digital memory cards of the transmitted set in response to a stimulus from one of (i) a connected device and (ii) a user.

12. The method of claim 1, wherein the processor is at the end user device or at a server.

13. A non-transitory computer-readable data storage medium having computer-readable program codes embodied therein for asynchronously delivering content, the computer-readable data storage medium program codes including instructions that, when executed by a processor, cause the processor to:
    obtain content including a plurality of digital memory cards from one or more third party content providers;
    classify one or more sets of the obtained digital memory cards by following rules of combination pertaining to the obtained digital memory cards, wherein a set of the one or more classified sets of digital memory cards includes digital memory cards that are chained together in a pre-set order configuration by following at least one of (i) a direction of a user and (ii) rules of chain sequencing;
transmit the set of digital memory cards to an end user device;
configure the end user device to receive the transmitted set;
configure the end user device to asynchronously manifest representations of digital memory cards of the transmitted set by following rules of delivery, prompting a user to further interact via push notifications with the end user device to view a digital memory card corresponding to a presently manifest representation thereof; and
configure the end user device to use machine learning to create a further set of digital memory cards predicted relevant to the user of the end user device based on one or more interactions of the user with the end user device.

14. The non-transitory computer-readable data storage medium of claim 13, wherein the obtained content represents content selected by the one or more third party content providers from existing source content.

15. The non-transitory computer-readable data storage medium of claim 13, wherein the obtained content represents content originally created by the one or more third party content providers.

16. The non-transitory computer-readable data storage medium of claim 13, wherein the end user device is one of (i) a computing device, (ii) a smart device, (iii) smart watch, or (iv) an Internet of Things (I) device.

17. The non-transitory computer-readable data storage medium of claim 13, wherein the processor is further configured to configure the end user device to manifest representations of digital memory cards of the transmitted set in response to a stimulus from one of (i) a connected device and (ii) a user.

18. The non-transitory computer-readable data storage medium of claim 13, wherein the set of the one or more classified sets of digital memory cards includes digital memory cards that are chained together in a pre-set order, the order implemented by following at least one of (i) a direction of a user and (ii) rules of chain sequencing.

19. The system of claim 1, wherein the processor is further configured to use machine learning to create a further set of digital memory cards predicted relevant to the user of the end user device based on one or more interactions of the user with the end user device.

20. The system of claim 1, wherein the processor is further configured to:
register the end user device with a service provider; and
pair, by an access control application, the end user device with the service provider to configure the user device to receive the set of digital memory cards.

21. The system of claim 20, wherein the processor is further configured to:
configure a multitude of additional computing devices associated with the end user device to receive the transmitted set by:
registering each of the additional computing devices with the service provider; and
pairing, by the access control application, each of the additional computing devices with the service provider to configure the user device to receive the transmitted set including broadcasting the transmitted set to the additional computing devices.

22. The system of claim 1, wherein the processor is configured to automatically trigger delivery of asynchronously manifest representations of digital memory cards of the transmitted set in response to an alert based on detected changes in biometrics processed from a wearable computing device associated with the user device.

23. The system of claim 1, wherein the processor is configured to automatically trigger delivery of asynchronously manifest representations of digital memory cards of the transmitted set in response to a calendar event detected from the user device.

24. The system of claim 1, wherein the processor is configured to automatically trigger delivery of asynchronously manifest representations of digital memory cards of the transmitted set in response to a third-party notification from the one or more third party content providers.

25. The system of claim 1, wherein the processor is configured to automatically trigger delivery of asynchronously manifest representations of digital memory cards of the transmitted set in response to the state of the user on this system or a linked system.

* * * * *

UNITED STATES PATENT AND TRADEMARK OFFICE
CERTIFICATE OF CORRECTION

PATENT NO. : 11,798,428 B2
APPLICATION NO. : 17/226031
DATED : October 24, 2023
INVENTOR(S) : Mark A. Herschberg It is certified that error appears in the above-identified patent and that said Letters Patent is hereby corrected as shown below:

In the Claims

In Claim 16, Column 15, Line 31, delete "Internet of Things (I) device" and insert -- Internet of Things (IoT) device --.

Signed and Sealed this
Twelfth Day of December, 2023

Katherine Kelly Vidal
*Director of the United States Patent and Trademark Office*